United States Patent
Kassner (10) Patent No.: US 12,501,175 B2
(45) Date of Patent: Dec. 16, 2025

(54) CAMERA MODULE, HEAD-WEARABLE EYE TRACKING DEVICE, AND METHOD FOR MANUFACTURING A CAMERA MODULE

(71) Applicant: PUPIL LABS GmbH, Berlin (DE)

(72) Inventor: Moritz Kassner, Berlin (DE)

(73) Assignee: Pupil Labs GmbH, Berlin (DE)

( * ) Notice: Subject to any disclaimer, the term of this patent is extended or adjusted under 35 U.S.C. 154(b) by 242 days.

(21) Appl. No.: 18/216,670

(22) Filed: Jun. 30, 2023

(65) Prior Publication Data

US 2024/0015410 A1 Jan. 11, 2024

Related U.S. Application Data

(60) Provisional application No. 63/359,173, filed on Jul. 7, 2022.

(51) Int. Cl.
*H04N 23/90* (2023.01)
*G03B 17/08* (2021.01)
*G06F 3/01* (2006.01)
*H04N 23/54* (2023.01)

(52) U.S. Cl.
CPC .............. *H04N 23/90* (2023.01); *G03B 17/08* (2013.01); *G06F 3/013* (2013.01); *H04N 23/54* (2023.01)

(58) Field of Classification Search
CPC ........ H04N 23/90; H04N 23/54; G03B 17/08; G06F 3/013
USPC ......................................................... 348/78
See application file for complete search history.

(56) References Cited

U.S. PATENT DOCUMENTS

| 4,852,988 A * | 8/1989 | Velez ..................... A61B 3/113 351/158 |
| 11,676,422 B2 * | 6/2023 | Dierkes ................ G06V 40/197 345/8 |
| 2011/0059286 A1 * | 3/2011 | Ullrich .............. B29C 45/14827 264/275 |
| 2016/0182435 A1 * | 6/2016 | Landqvist ............... H04L 51/52 709/204 |
| 2017/0363885 A1 | 12/2017 | Blum et al. |
| 2021/0019524 A1 * | 1/2021 | Anderson ............... G06F 3/013 |

(Continued)

FOREIGN PATENT DOCUMENTS

EP 3973346 3/2022
WO 2008/045137 4/2008

(Continued)

*Primary Examiner* — Matthew David Kim
(74) *Attorney, Agent, or Firm* — Dicke, Billig & Czaja, PLLC (57) ABSTRACT

A camera module is disclosed. The camera module is for complementing a support structure of a head-wearable device to form a head-wearable eye tracking device. In one example, the camera module includes a one-piece base structure including a substantially transparent material, and comprising an upper portion, a first leg portion and a second leg portion, a camera connecting structure embedded in the one-piece base structure, a first eye camera connected with the camera connecting structure, and arranged in and/or on the first leg portion, a second eye camera connected with the camera connecting structure, and arranged in and/or on the second leg portion, and a scene camera connected with the camera connecting structure, and arranged in and/or on the upper portion.

20 Claims, 6 Drawing Sheets

(56) References Cited

U.S. PATENT DOCUMENTS

| | | |
|---|---|---|
| 2022/0034224 A1 | 2/2022 | Kassner |
| 2022/0083134 A1 | 3/2022 | Kassner et al. |
| 2022/0342224 A1 | 10/2022 | Kassner |
| 2023/0014774 A1* | 1/2023 | Shin .................. G06V 20/20 |
| 2023/0121025 A1* | 4/2023 | Choe .................. H05K 1/0277 |
| | | 361/749 |
| 2023/0146677 A1* | 5/2023 | Woo .................. G06F 3/017 |
| | | 345/156 |
| 2023/0213773 A1* | 7/2023 | Ma .................. G06V 10/761 |
| | | 345/8 |
| 2023/0222757 A1* | 7/2023 | Beith .................. H04W 12/02 |
| | | 382/103 |
| 2023/0298721 A1* | 9/2023 | Jacobs .................. G06Q 10/08 |
| 2024/0009530 A1* | 1/2024 | Park .................. A63B 71/0619 |
| 2024/0272439 A1* | 8/2024 | Jiang .................. G02B 7/022 |

FOREIGN PATENT DOCUMENTS

| | | |
|---|---|---|
| WO | 2020/244971 | 12/2020 |
| WO | 2021/164867 | 8/2021 |

* cited by examiner

CAMERA MODULE, HEAD-WEARABLE EYE TRACKING DEVICE, AND METHOD FOR MANUFACTURING A CAMERA MODULE

CROSS REFERENCE TO RELATED APPLICATION

This Non-Provisional Patent Application claims the benefit of the filing date of U.S. Provisional Patent Application Ser. No. 63/359,173, filed Jul. 7, 2022, which is herein incorporated by reference.

TECHNICAL FIELD

Embodiments of the present invention relate to a camera module for complementing a support structure of a head-wearable device to form a head-wearable eye tracking device, a head-wearable eye tracking device, and a manufacturing method.

BACKGROUND

Portable eye tracking devices for eye tracking and/or to detect one or more gaze-related parameters of a user, for example in the form of head-wearable spectacle-like systems offer many advantages over stationary, remote eye tracking systems when it comes to the range of possible application scenarios and use cases. Outdoor activities like sports or tasks like operating large machinery are examples for eye tracking application areas in which free head and body movement is required and for which head-worn devices are thus the solution of choice. At the same time, such use cases often also require the wearer to wear specialized eyewear, like protective eyeglasses of various kinds. Pilot visor helmets, skiing- or swimming-goggles, sports helmets, head-band structures and welding protective googles are further examples. Further, physiological features like head or nose shapes of the wearers can vary in wide ranges, e.g. as a function of ethnicity or age.

Existing portable devices traditionally provide integrated spectacle-type systems which do not provide enough flexibility to fit different specialized scenarios and/or are not suitable for children.

Document EP 3973346 A1 describes an eye tracking module for attachably complementing a head-wearable device of a user allowing for flexibility and/or adaptability to different use cases.

However, there is still room to further improve portable eye trackers and head-wearable eye tracking devices, respectively, in particular with regard to manufacturing, long term mechanical stability, reproducibility and/or accuracy.

SUMMARY

According to an embodiment of a camera module for complementing a support structure of a head-wearable device to form a head-wearable eye tracking device, the camera module includes a one-piece base structure which includes an at least semi-transparent material, typically a substantially transparent material and includes an upper portion, a first leg portion and a second leg portion. A camera connecting structure is embedded in the one-piece base structure. A first eye camera is connected with the camera connecting structure, and arranged in and/or on the first leg portion. A second eye camera is connected with the camera connecting structure, and arranged in and/or on the second leg portion. A scene camera is connected with the camera connecting structure, and arranged in and/or on the upper portion.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

For sake of clarity, the Figures are provided with a respective Cartesian coordinate system x, y, z typically representing a respective eye tracking module coordinate system and scene camera coordinate system, respectively.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Points and directions may be specified within the scene camera images, an eye camera coordinate system, a scene camera coordinate system, an eye tracking module coordinate system, a head coordinate system, a world coordinate system and/or any other suitable coordinate system.

According to an embodiment of a camera module for complementing a support structure of a head-wearable device to form a head-wearable eye tracking device, the camera module includes a one-piece base structure which includes an at least semi-transparent material, typically a substantially transparent material and includes an upper portion, a first leg portion and a second leg portion. A camera connecting structure is embedded in the one-piece base structure. A first eye camera is connected with the camera connecting structure, and arranged in and/or on the first leg portion. A second eye camera is connected with the camera connecting structure, and arranged in and/or on the second leg portion. A scene camera is connected with the camera connecting structure, and arranged in and/or on the upper portion.

The first eye camera may be used for taking first images of at least a portion of a first eye of the user wearing the head-wearable eye tracking device, e.g. a left eye, of the user, and the second eye camera may be used for taking second images of at least a portion of a second eye of the user, e.g. of a right eye of the user.

Within this specification the terms "first camera", "first eye camera" and "left camera" are used synonymously. Likewise, the terms "second camera", "second eye camera" and "right camera" are used synonymously herein.

The first leg portion and the second leg portion, are typically implemented as comparatively thin, elongated elements, in particular respective camera arms. For example, the respective leg portion may have a thickness of less than about 5 mm or even 3 mm, at least close to the upper portion.

The base structure and the legs are designed in this way to avoid any contact of the leg portions with the user's nose or face, and/or to reduce occlusion of the visual field of the user.

The camera module is typically not configured to shape a nose bridge portion, instead the support structure of the complementing head-wearable device may contain a nose bridge portion.

In this regard it is noted that making the first leg portion and the second leg portion sufficiently transparent and thin, and not part of the support structure and the nose bridge portion, respectively, allows for camera placement further towards the forward-facing lines of sight of the user while keeping both product design compact and occlusion low or even minimal.

The recorded eye images do not necessarily need to be a picture as visible by the human eye, but can also be an appropriate representation of the recorded eye in a range of light non-visible for humans.

The recorded eye images may e.g. be used for determining one or more gaze-related parameters of a user wearing a head-wearable eye tracking device provided with the camera module. This may even be done by a controller of the camera module, which in these embodiments may form an eye tracking module, but also by an external device, e.g. a companion device such as a tablet or smartphone connectable with the camera module, typically via the head-wearable device.

The gaze-direction related parameter may be a gaze direction, a cyclopean gaze direction, a 3D gaze point, a 2D gaze point, a visual axis orientation, an optical axis orientation, a pupil axis orientation, and a line of sight orientation of the user.

The gaze-related parameter may be a gaze-direction related parameter or a position and/or an eyelid closure, a pupil area, a pupil size, a pupil diameter, a measure of cognitive load, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a flat and/or a steep axis, a limbus major and/or minor axes orientation, an eye cyclo-torsion, an eye intra-ocular distance, an eye vergence, a statistics over eye adduction and/or eye abduction, and a statistics over eye elevation and/or eye depression, data about blink events, drowsiness and/or awareness of the user, parameters for user iris verification and/or identification.

The scene camera may be used for taking images of a field of view of the user wearing the head-wearable device complemented with the camera module. In the following, the images of the field of view of the user are also referred to as scene images. Accordingly, the scene camera is not to be understood as a camera for taking a picture of an eye of the user.

For reasons of accuracy, the scene camera may have a resolution of at least 640×480 pixels or at least 800×600 pixels, more typically of at least 1024×768 pixels, and even more typically of at least 1280×1024 pixels or at least 1920×1080 pixels.

The resolution of the eye cameras and the images may be lower compared to the scene camera, e.g. be at most 400×400, or even at most 200×200.

Corresponding scene and eye images may e.g. be used to determine what the user is looking at. Again, this may be done by the camera module or by an external device.

As the cameras of the camera module are firmly connected with the one-piece base structure, the camera poses, i.e. the positions and orientations of the cameras with respect to each other may be particularly precisely fixed during manufacturing in a comparatively efficient and/or simple way also ensuring mechanical long-term-stability and reproducibility. This is advantageous for achieving high eye tracking accuracy and high accuracy in determining eye parameters, respectively. For example, the knowledge of the relative eye camera poses, i.e. the relative positions and orientations of the first and second eye cameras are shown to be important for determining eye parameters in document WO 2020/244971 A1.

The transparency of the material of the one-piece base structure typically refers to a transparency in an infrared-light range, in particular a near-IR light range, and/or a visible light range. In particular, the substantially transparent material of the one-piece base structure is typically substantially transparent in an IR-light range, in particular a near-IR light range, and/or for light in a visible range.

Further, the substantially transparent material of the one-piece base structure is typically a solidified material, in particular a respective silicone or plastic.

This may facilitate manufacturing because the cameras as well as optional light sources may substantially or even completely be embedded in the material.

Further, using a substantially transparent and typically substantially non-reflective material for the one-piece base structure facilitates reducing or even avoiding any obstruction of the visual field of a user wearing the head-wearable device complemented with the camera module.

The typically watertight camera module may, in particular, be manufactured by overmolding also allowing for forming particularly thin layers overlaying the camera connecting structure, in particular of parts thereof that are arranged in the first leg portion and the second leg portion allowing for a particularly lightweight and/or unobtrusive camera module, the camera objectives, and/or the optional light sources for illuminating the user's eyes.

Accordingly, the camera connecting structure is typically molded into the one-piece base structure.

Manufacturing the camera module by overmolding also allows to long term stably embed the first eye camera, the second eye camera, and the scene camera at least partly in the one-piece base structure with defined camera poses, in a reproducible, cost-effective manner also ensuring water tightness.

At least one of, typically all of the first eye camera, the second eye camera, and the scene camera may be mechanically and electrically connected to the camera connecting structure.

Further, the camera connecting structure is typically at least partially flexible. This may facilitate manufacturing the camera module in a mold providing fixation structures for the cameras during molding. This is explained in more detail below.

The camera module overmold material may also not be substantially stiff but allow elastic deformations of parts of the camera module during handling. When installed into the support structure, the camera module may return to its original shape.

The camera connecting structure may include a circuit board, more typically a respective circuit board for each of the first eye camera, the second eye camera, and the scene camera.

The camera connecting structure may in addition include a further circuit board for receiving respective images from each of the first eye camera, the second eye camera, and the scene camera. The further circuit board may be equipped with electronic components to control image recording, forward, preprocess and/or even process the received image data.

The further circuit board may form or be equipped with a controller providing desired control and/or image processing functionality.

The further circuit board and the controller, respectively, are typically completely embedded within the one-piece base structure, and may be arranged in the upper portion, typically above the scene camera and in an uppermost part of the one-piece base structure, respectively.

The scene camera is typically also arranged in the upper portion of the camera module and the one-piece base structure, respectively.

The controller may be configured for at least one of:
receiving control commands via an electric connector of the camera connecting structure;
triggering a respective image or video recording of the scene camera, the first eye camera and/or the second eye camera;
distributing power to or between cameras and/or light sources;
compressing a scene image, a first eye image and/or a second eye image;
determining a gaze-related parameter of a user based on first and/or second eye image;
pre-processing a scene image received from the scene camera, a first eye image received from the first eye camera, and/or a second eye image received from the second eye camera;
forming a dataset comprising the scene image, the first eye image, the second eye image, the pre-processed scene image, the pre-processed first eye image, the pre-processed second eye image and/or a time stamp; and
sending the dataset to the electric connector, in particular as network packets and/or an USB packets.

To provide a desired flexibility during manufacturing, a respective wire connection between the circuit boards may be used.

Alternatively or in addition, the camera connecting structure may be implemented and/or include one or more flexible circuit boards, in particular a flex PCB or a rigid-flex PCB.

The base structure is typically, at least in a lower portion, shaped to partly surround a nose of the user, in particular a nasal bridge of the user's nose, and at least substantially mirror symmetric with respect to a central plane of at least the lower portion typically including two leg portions.

In particular, the lower portion typically includes a first leg portion and a second leg portion which are at least substantially mirror-symmetric with respect to the symmetry plane.

The camera module is typically formed such that the first leg portion and the second leg portion are spaced apart from at least one of, typically both of the user and the support structure when the user is wearing the head-wearable eye tracking device.

Further, the first eye camera may be arranged on and/or in the first leg portion, and the second eye camera may be arranged on and/or in the second leg portion.

Typically, at least one of a first angle between an optical axis of the first eye camera and the symmetry plane, and a second angle between an optical axis of the second eye camera and the symmetry plane is in a range from about 147° to 135°, more typically about 141°, i.e. 141°+/−6°. Further, at least one of a third angle between the optical axis of the first eye camera and a plane perpendicular to the symmetry plane, and a fourth angle between the optical axis of the second eye camera and this plane is about 20°+/−6°. Accordingly, an optimal view of the eye cameras onto an eyeball of the user is enabled.

Furthermore, the first angle may at least substantially correspond to the second angle. Likewise, the third angle may at least substantially correspond to the fourth angle.

The one-piece base structure typically also provides an outer surface of the camera module. Thus, the one-piece base structure, which is in the following also referred to as base structure for short, may not only provide supporting functionality but also provides the function of a housing for protecting the included components.

Typically, the outer surface of the one-piece base structure is at least substantially mirror symmetric with respect to the symmetry plane.

Further, the scene camera is typically at least substantially centred with respect to the symmetry plane. An optical axis of the scene camera may at least substantially be arranged in the symmetry plane, or at least close to the symmetry plane and/or close to eye midpoint of the user. This facilitates a compact design. Furthermore, the influence of parallax error for gaze prediction may be significantly reduced this way.

Likewise, the first eye camera and the second eye camera are typically arranged at least substantially mirror-symmetrically with respect to the symmetry plane.

Placing the eye camera close to the symmetry plane also facilitates a comparatively compact camera module.

The camera module may fit into an enveloping cuboid with dimensions of at most about 3 cm×5 cm×5 cm or even at most about 2 cm×4 cm×4.5 cm.

A first distance between the first eye camera and the symmetry plane may be at most about 20 mm. Further, a second distance between the second eye camera and the symmetry plane at least substantially corresponds to the first distance and/or is at most about 20 mm.

An absolute difference between the first distance and the second distance may be at most about 1 mm, more typically at most about 0.5 mm or even 0.2 mm.

At least one of the first distance and the second distance may be at most about 15 mm, at most about 14 mm, or even at most about 12 mm.

When the camera module is attached to the support structure of the head-wearable device, the field of view of the wearer may not be occluded, at least not discernible for the wearer. Note that an obstruction of the visual field of the user may essentially not be noticeable by the user since the human mind mostly ignores any obstruction in the nose area of the face, because the nose itself forms a permanent obstruction of the visual field.

The camera module is typically attached to the central portion so that relative camera poses of the first and second eye cameras remain at least substantially fixed even when the central portion of the support structure is deformed under normal wearing conditions.

For this purpose, the camera module may provide a fastenings means typically fitting with a fastener and arranged at least close to the symmetry plane.

The camera module may include one, typically two fastening means for fastening the one-piece base structure at the support structure and/or releasably attaching the one-piece base to the support structure of the head-wearable device, in particular two respective mechanical or magnetic fastening means.

The one or more fastening means may be arranged next to an optical entrance of the scene camera, e.g. an objective lens of the scene camera.

The one or more mechanical fastening means may e.g. be implemented as holes in the base structure.

The camera module may be removably attached with screws, snaps or magnets to the supporting structure of the head-wearable device. The connection of the camera module to the support structure may be made such that flexing and bending of the support structure does not or almost not bend or flex the camera module. Mechanical decoupling may be at least facilitated or even fully achieved by one or more fasteners being concentrated in a comparatively small central area of the support structure rather than spread across an area of the support structure that may be subject to bending and flexing. Furthermore, mechanical decoupling may be facilitated or even fully achieved because the camera module arms, in particular in the area of the eye cameras are not connected to the supporting structure.

Instead of directly connecting to the supporting structure, the camera module may connect to an interposing carrier. This optional interposing carrier may further facilitate mechanical decoupling. Typically, the carrier is attached to the central portion of the support structure permanently. In these embodiments, the camera module may be removably attached with screws, snaps or magnets to the carrier that may be screwed and/or glued to the central portion.

Typically, a distance between the two mechanical fastening means is at most about 15 mm or even 10 mm, or even only 5 mm.

This facilitates reducing any transmission of deformations between the support structure of the head-wearable device and the camera module.

Typically, the first eye camera, the second eye camera, and the scene camera are mechanically and electrically connected to the camera connecting structure.

The camera connecting structure may include a circuit board, more typically a respective circuit board for each of the first eye camera, the second eye camera, and the scene camera.

Typically, a further circuit board typically equipped with a controller and/or configured for receiving respective images from each of the first eye camera, the second eye camera, and the scene camera is provided, in particular in an uppermost part and above the scene camera, respectively.

To facilitate manufacturing, the camera connecting structure may be at least partially flexible.

For this purpose, a wire connection may be provided between the circuit boards.

Alternatively or in addition, the camera connecting structure may be implemented as and/or include a flexible circuit board, in particular a flex PCB or a rigid-flex PCB.

According to an embodiment of a head-wearable eye tracking device, the head-wearable eye tracking device includes a support structure comprising a central portion which is, when the head-wearable eye tracking device is worn by a user, arranged closest to and/or on a nose of the user, and a camera module as explained herein which is fastened to the central portion so that the first leg portion and the second leg portion camera module are at least substantially mechanically decoupled from the support structure. Accordingly, camera poses are not substantially affected by deformation/bending of the support structure.

This may be achieved by a carrier interposed between the support structure and the camera module, symmetrically attaching the carrier and/or the camera module to the support structure, and/or by shaping the camera module so that the first leg portion and the second leg portion are spaced apart from the user and/or the support structure when the user is wearing the head-wearable eye tracking device.

Typically, the central portion is configured to provide a nose bridge portion of the user's nose.

In this regard it is noted that, not only for reasons of high wearing comfort, mechanical decoupling of the eye imaging components and the head-wearable device is preferred compared to making the structures of the head-wearable device stiffer.

According to an embodiment, the head-wearable eye tracking device includes a support structure comprising a central portion which is, when the head-wearable eye tracking device is worn by a user, arranged closest to and/or on a nose of the user, and/or provides a nose-bridge portion, and a camera module including a one-piece base structure with an upper portion, a first leg portion, and a second leg portion. A first eye camera is arranged in and/or on the first leg portion, a second eye camera is arranged in and/or on the second leg portion, and a scene camera is arranged in and/or on the upper portion. The camera module is fastened to the central portion in an at least substantially mirror symmetric way with respect to a symmetry plane of at least one of, typically both of the support structure and the camera module, an optical axis of the scene camera being at least substantially parallel to the symmetry plane and/or arranged within the symmetry plane. Typically, two fastening means arranged mirror-symmetric with respect to the symmetry plane are used.

Alternatively or in addition, a carrier is mechanically connected with and arranged between the upper portion of the one-piece base structure and the central portion of the support structure, and is configured to reduce a transmission of a deformation of the central portion of the support structure to the upper portion of the camera module.

Due to the interposed carrier, deforming of the upper portion of the camera module and thus of the whole camera module due to a deformation of the central portion, which may be due to external loads acting on the support structure and/or changes in temperature, is at least reduced. In particular, the impact of any deformation of the support structure, for example a bending of the support structure such as a spectacle frame, on the relative camera poses may also be at least reduced. This allows for also high accuracy under varying conditions, and may in particular be advantageous if calibration-free or hardware-calibrated eye tracking is desired.

Typically, the carrier is mechanically connected with and arranged between the upper portion and the central portion for at least reducing a deformation of the upper portion when the central portion is deformed, in particular due to external loads acting on the central portion of the support structure such as bending and/or torsional forces which may, for example, be transmitted through spectacle temples.

The carrier is typically mechanically connected with and arranged between the upper portion and the central portion to reduce transmitting at least one of, typically all of a tension, a compression, a bending force and a torque.

The camera module may be any of the camera modules as explained herein and/or a camera module manufactured as explained herein.

The carrier may be releasably connected with the upper portion of the one-piece base structure and the central portion of the support structure.

Further, the carrier may include an at least substantially central trough hole for the scene camera. Alternatively, the carrier may have a sufficiently transparent region for the optical entrance of the scene camera.

The carrier may be fastened to the central portion in a mirror symmetric way with respect to the at least substantially central trough hole and the transparent region, respectively.

Further, the carrier may be implemented as a circuit board, in particular a PCB.

Typically, a plug-socket connection is provided between the camera module and the carrier or the camera module and central portion of the head-wearable device. In particular, two respective plug-socket connections, which are arranged mirror symmetric with respect to the symmetry planes of the device, the camera module and/or the carrier, and a common the symmetry plane in the assembled state, may be used for the connection.

The plug-socket connection typically includes one or more spring-loaded pins, in particular pairs two or three spring-loaded pins.

Furthermore, the head-wearable eye-tracking device may include an external electric connector for power supply and/or data exchange, and an internal wiring electrically connecting the second electric connector with an internal electric connector and/or the plug-socket connection.

The second electric connector may be used for power supply from and/or data exchange with a companion computing device.

The second electric connector may be a USB-connector such as an USB-C-connector. However, the second electric connector may also be a connector for another external computer bus, in particular a computer bus and power connector such as a Thunderbolt-connector or a Lightning connector or even an Ethernet-connector.

Further, the second electric connector may be arranged at a dorsal end of a frame of the head-wearable device providing the support structure, and/or of a temple of the head-wearable device, respectively. Thereby a connection can be established in an unobtrusive way and wearing comfort may even be increased.

Via the second electric connector, the camera module may be connected with a computing companion device such as smartphone, a tablet or the like, supplied with electric power from the companion device and even controlled by the companion device, for example by an app running on the companion device.

The head-wearable device may be a spectacle device, a pilot visor helmet, an AR head-wearable display, a VR head-wearable display or a goggles, for example a skiing-goggles, a swimming-goggles, a sports helmet, a head-band structure or a welding protective googles.

In embodiments referring to spectacle devices, the frame may include a first frame portion at least partly surrounding a first ocular opening, a second frame portion at least partly surrounding a second ocular opening, and the central portion may form a bridge portion mechanically connecting the first frame portion and the second frame portion In other words, the head-wearable device may include a frame including a first frame portion at least partly surrounding a first ocular opening, a second frame portion at least partly surrounding a second ocular opening, a bridge portion mechanically connecting the first frame portion and the second frame portion, and a first electric connector arranged on and/or in the bridge portion.

The frame of the head-wearable device may include a passage opening for receiving a protruding portion of the scene camera of the camera module as explained herein.

According to an embodiment of a method for manufacturing a camera module for a head-wearable device, the method includes providing a camera connecting structure equipped with a first eye camera and a second eye camera, providing a mold comprising a first fixation structure for the first eye camera and a second fixation structure for the second eye camera, arranging the connecting structure in the mold so that the first eye camera is arranged in and/or at the first fixation structure, and the second eye camera is arranged in and/or at the second fixation structure, filling the mold with a material, and solidifying the material to at least substantially fix a positional relationship and a orientational relationship of the first eye camera and the second eye camera with respect to each other.

Accordingly, the camera poses of the camera module may be set precisely defined in the mold, and long-term stably be fixed by curing the material filled into the mold.

Solidifying may include and/or be achieved by curing of the material, in particular chemical or thermal curing.

As already explained above, the camera connecting structure itself is typically at least partly flexible to facilitate arranging the cameras in the mold in the desired positions and orientations temporarily fixed by respective fixation structures.

The camera connecting structure may in particular include an at least partly flexible board such as a flex PCB or a rigid-flex PCB.

The camera connecting structure is typically additionally provided with a scene camera.

However, with the molding process described herein, it is also possible to manufacture a camera module without a scene camera.

Likewise, it is also to manufacture a camera module without a scene camera and one eye camera only with the molding process described herein.

Further, the camera connecting structure may be provided with a first light source for illuminating a field of view of the first eye camera, and/or a second light source for illuminating a field of view of the second eye camera, in particular with a respective LED.

The mold may include a third fixation structure for the scene camera and/or a recess for partly accommodating the scene camera in the mold.

Accordingly, arranging the connecting structure in the mold may include arranging the scene camera in and/or at the third fixation structure of the mold, in the recess and/or on a sealing support of the mold for the scene camera, in particular on and/or at a respective sealing support for an optical entrance of the scene camera.

Separate fixations structures for the optional light sources are typically not required.

However, if the poses of those light sources play a role in determining gaze-related parameters, as for example in glint-based eye tracking systems, the same manufacturing strategies as described herein using fixation receptacles for eye cameras can be used for light sources.

The first fixation structure is typically implemented as a first receptacle for a portion of the first eye camera.

Likewise, the second fixation structure is typically implemented as a second receptacle for a portion of the second eye camera.

The first receptacle may at least substantially positively fit with a housing of the first eye camera next to an optical entrance of the first eye camera.

Likewise, the second fixation structure may at least substantially positively fit with a housing of the second eye camera next to an optical entrance of the second eye camera.

Typically, the first fixation structure and/or the second fixation structure are implemented as a respective recess or hole in a wall of the mold.

The connecting structure is typically arranged in the mold so that the cameras' poses are fixed in the mold, for example so that a portion of the first eye camera is arranged in the first receptacle and a portion of the second eye camera is arranged in the second receptacle.

The material used for molding is typically, at least in the solidified state, transparent.

This facilitate manufacturing a watertight camera module with the eye cameras being substantially or even completely embedded. Note that even the respective optical camera entrance may be covered with a thin layer of the solidified transparent material.

The material may be a plastic or a silicone.

The manufactured camera module is typically shaped to partly surround a nose of the user but not shaped as a nose bridge portion but rather spaced apart from the user's face, in particular the user's nose when wearing the head-wearable eye tracking device, and/or at least substantially mirror symmetric with respect to a symmetry plane.

In the following, the symmetry plane is also referred to as vertical plane.

The term "at least substantially mirror symmetric with respect to a plane" as used within specification intends to describe that at least the outer surface or boundaries of two elements or objects are mirror symmetric with respect to the plane with an accuracy which is typically achievable with the materials and manufacturing methods used, in particular with an accuracy of at least 5% or even at least 2% or 1%, at least on average, and/or that two parts of an outer surface or boundary of one element or object are mirror symmetric with respect to the plane with an accuracy of at least 5% or even at least 2% or 1%, at least on average. In particular, a centre of gravity of the outer surfaces lies within the plane or is at most about 1 mm or even at most about 0.5 mm, more typically at most about 0.2 mm spaced apart from the plane.

The term that "a second distance at least substantially corresponds to the first distance" as used within specification intends to describe that a relative difference between the first distance and the second distance is at most about 5%, more typically at most about 2% or even 1%.

Those skilled in the art will recognize additional features and advantages upon reading the following detailed description, and upon viewing the accompanying drawings.

With reference to FIGS. 1A to 1D, an embodiment of a camera module 100 for complementing a support structure of an electronic head-wearable device of a user is explained.

Figure 1A:
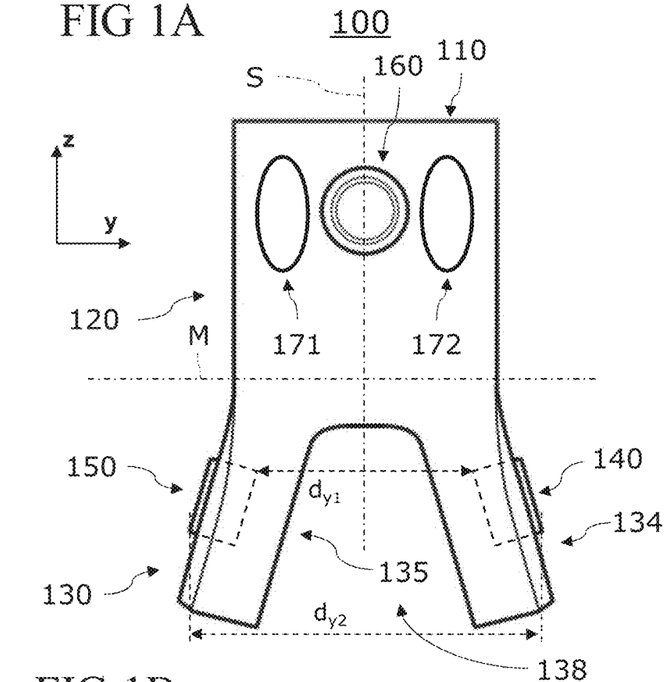
FIG. 1A illustrates a front view of a camera module for attachably complementing a support structure of a head-wearable device of a user according to an embodiment.

As shown in FIG. 1A illustrating a front view of camera module 100, a one-piece base structure 110 of module 100 may be mirror symmetric with respect to a virtual central symmetry plane S. Further, a lower portion 130 of base structure 110 may have a left leg portion 134 and a right portion leg portion 135 formed such that a recess 138 for a user's nose is formed in lower portion 130.

In the exemplary embodiment, one-piece base structure 110 accommodates in an upper portion 120 a scene camera 160 arranged in plane S, and a two-part electric connector 171, 172, which is typically implemented as a two-part electro-mechanical connector, and, in the lower portion 130, a left eye camera 140 and a right eye camera 150.

More particular, the left leg portion 134 accommodates the left eye camera 140, and the right leg portion 135 accommodates the right eye camera 150.

The left eye camera 140 and the right eye camera 150 are arranged mirror symmetric to each other with respect to central plane S. Further, both the scene camera 160 and the two parts of the electric connector 171, 172 are mirror symmetric with respect to central plane S.

In front view and in a projection onto one or even two planes P, M perpendicular to the symmetry plane S and the optical axis 165, respectively, the scene camera 160 is arranged between the two parts of electric connector 171, 172. Typically, their centres lie on a line in the respective view/projection. However, the optical axis 165 may also be tilted with respect to plane M, for example by up to 10° or even 20°.

Figure 1B:
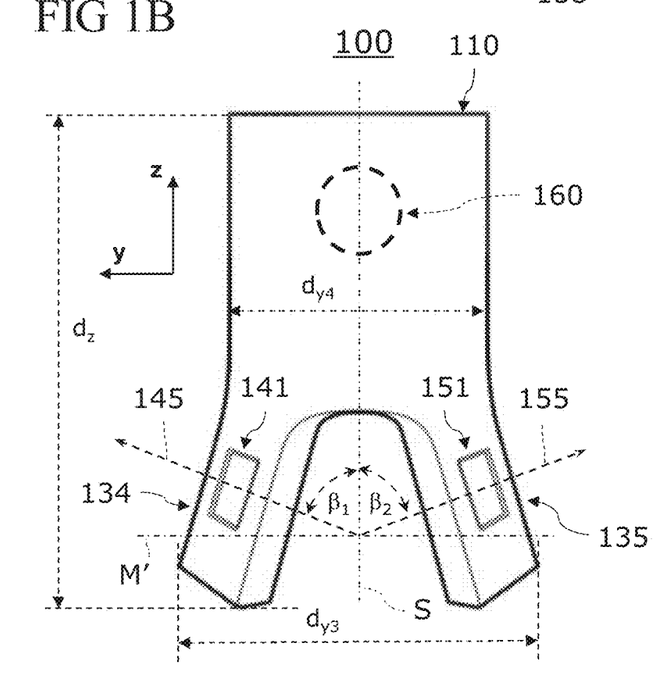
FIG. 1B illustrates a back view of the camera module shown in FIG. 1A according to an embodiment.
Figure 1C:
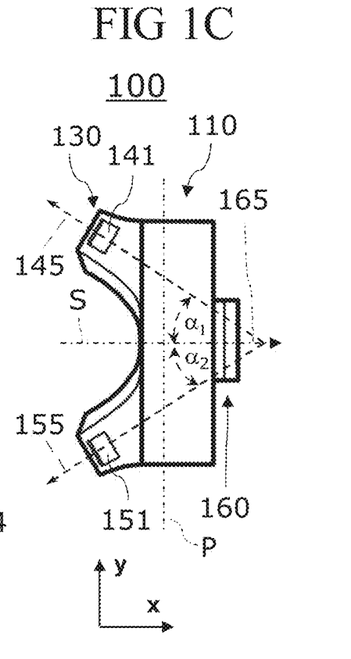
FIG. 1C illustrates a top view of the camera module shown in FIG. 1A according to an embodiment.
Figure 1D:
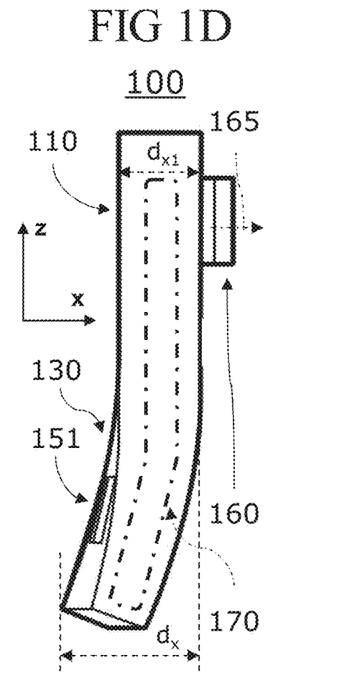
FIG. 1D illustrates a lateral view of the camera module shown in FIG. 1A according to an embodiment.

For the sake of clarity, not the eye cameras 140, 150 but recesses 141, 151 in one-piece base structure 110 for accommodating the eye cameras 140, 150 are illustrated in FIGS. 1B to 1D. For the same reason, neither electrical or mechanical contacts typically arranged inside one-piece structure 110 are shown in FIGS. 1B to 1D nor is the electric connector 171, 172 shown in FIGS. 1B to 1D. In FIG. 1A, eye cameras 140, 150 are indicated as slightly protruding from the base structure 110, however they can be embodied completely integrated into the base structure, with no protruding parts.

A first distance between the left eye camera 140 and the symmetry plane S is typically at most 20 mm, at least in front view and in the projection onto the plane P, respectively. Likewise, a second distance between the right eye camera 150 and the symmetry plane S is typically at most 20 mm, at least in front view and in the projection onto the plane P, respectively. In the exemplary embodiment, the eye cameras 140, 150 are mirror-symmetric with respect to symmetry plane S. Accordingly, the first distance matches the second distance. The first and second distances may be respective minimum distances or more typically respective maximum distances. Said first and second distances may also measure the respective distance between an center of the eye camera 140, 150 and the symmetry plane S, in the direction perpendicular to plane S. Further, said camera centers may for example be half-way between $d_{y1}/2$ and $d_{y2}/2$.

In a projection onto a plane M which is perpendicular to the symmetry plane S and the plane P and in top view, respectively, scene camera 160 is spaced apart from the parts 171, 172 of electric connector 171, 172.

As illustrated in FIG. 1C, a first angle $\alpha_1$ between an optical axis 145 of left eye camera 140 and symmetry plane S, and a second angle $\alpha_2$ between an optical axis 155 of right eye camera 150 and symmetry plane S may be about 141°.

Furthermore, the first angle $\alpha_1$ may corresponds to the second angle $\alpha_2$.

As illustrated in FIG. 1B, a second angle 90°-$\beta_1$ between optical axis 145 of left eye camera 140 and a plane M', which is parallel to the x-y plane as indicated by the coordinate systems and perpendicular to symmetry plane S, and a fourth angle 90°-$\beta_2$ between optical axis 155 of right eye camera 150 and plane M' may be both about 20°, and/or at least substantially equal.

The total height $d_z$ of one-piece base structure 110 may be in a range from about 2.5 cm to about 5 cm, more typically in a range from about 3 cm to about 4.5 cm.

The widths of one-piece base structure 110, i.e. the extension of base structure 110 in a direction perpendicular to the symmetry plane S typically varies as function of the height and is typically in a range from about 2 cm to 5 cm, more typically in a range from about 2 cm to about 4 cm.

As illustrated in FIGS. 1A, 1B, the width $dy_4$ of upper portion 120 may be substantially constant and/or lower than the maximum width $dy_3$ of lower portion 130, for example by a factor of 1.1 to 1.4.

As illustrated in FIGS. 1A to 1D, legs 134, 135 are typically bent.

Alternatively or in addition, the depth $d_{x1}$ of one-piece base structure 110 may vary as function of height.

The depth $d_{x1}$ may be in a range from about 1 cm to about 2 cm, more typically in a range from about 1 cm to 1.7 cm.

The total extension $d_x$ in x-direction may be in a range from about 1.2 cm to about 3 cm, more typically in a range from about 1.5 cm to 2 cm.

As illustrated in FIG. 1D, the scene camera 160 may protrude from one-piece base structure 110.

However, the scene camera 160 and/or the electric connector 171, 172 may also be arranged within one-piece base structure 110, i.e. such that they are accessible from the outside but do not protrude from the base structure.

As illustrated in FIG. 1D, a camera connecting structure 170 for electrically connecting scene camera 160 and eye cameras 140, 150 may be embedded in one-piece base structure 110 and connected with the cameras 140, 150, 160.

Figure 2A:
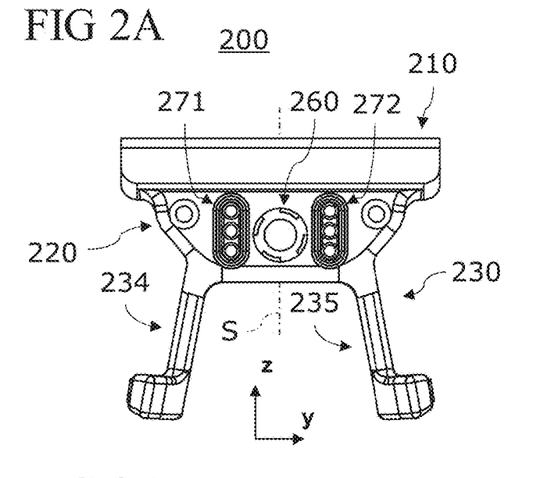
FIG. 2A illustrates a front view of a camera module for attachably complementing a support structure of a head-wearable device of a user according to an embodiment.

FIG. 2A illustrates a front view of a camera module 200 for attachably complementing a support structure of a head-wearable device of a user.

Camera module 200 is typically similar to camera module 100 explained above with regard to FIGS. 1A-1D and also has substantially transparent one-piece base structure 210 with a lower portion 230 with two leg portions 234, 235, but is illustrated in more detail.

This applies in particular to the exemplary two-part electric-mechanical connector 271, 272 formed in upper portion 220 left and right of scene camera 260 as respective socket with three electrical contacts 255 for typically spring-loaded pins 655 of a carrier 650 of a head-wearable device 600 to be complemented with camera module 200.

Figure 2B:
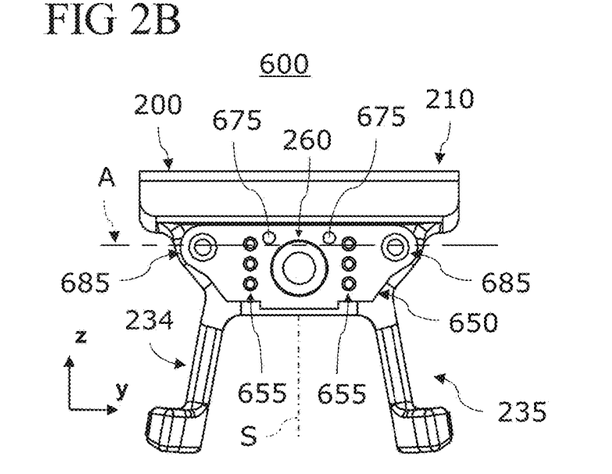
FIG. 2B illustrates another front view of the camera module shown in FIG. 2A and a carrier according to an embodiment.
Figure 2C:
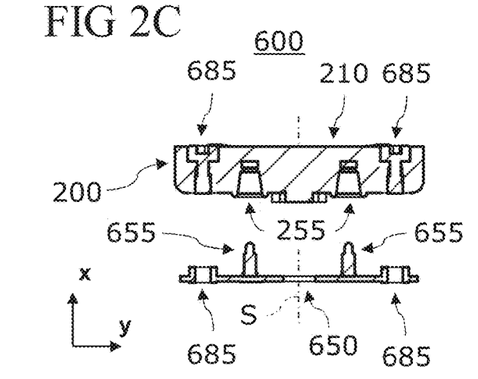
FIG. 2C illustrates a cross-sectional view of the camera module and carrier shown in FIG. 2B according to an embodiment.
Figure 2D:
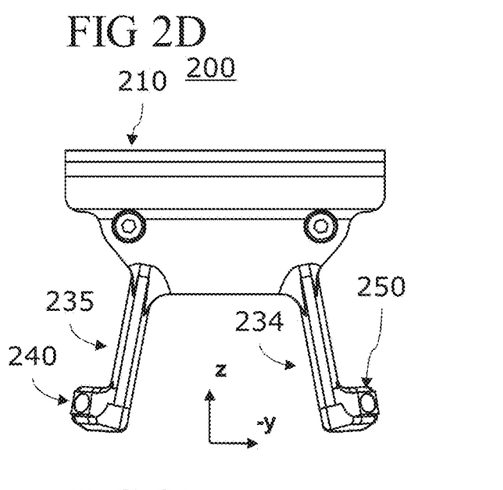
FIG. 2D illustrates a back view of the camera module shown in FIG. 2A according to an embodiment.
Figure 2E:
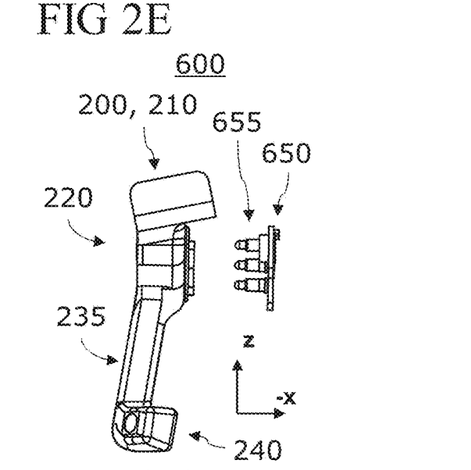
FIG. 2E illustrates a side view of the camera module and carrier shown in FIG. 2B according to an embodiment.

While FIG. 2B is also a front view of camera module 200 including carrier 650 hiding connector 271, 27, FIG. 2C shows a cross-sectional view along line A in FIG. 2B, FIG. 2D is a back view, and FIG. 2E is a side view of camera module 200 and a carrier 650, respectively.

As indicated in FIG. 2B by elements 675 that may e.g. represent holes or screws, carrier 650 may be fastened with the central portion 603 of the support structure by two fastening means arranged mirror-symmetric with respect to symmetry plane S, typically close to symmetry plane S, e.g. at a distance of at most 4 mm or even at most 3 mm, and/or above and/or close to the scene camera 260. This allows for a particularly stable and mechanically decoupled fastening of camera module 200 to the support structure of head-wearable device 600.

Alternatively, or in addition, an adhesive joint may be formed between carrier 650 and central portion 603.

As indicated by reference numerals 685, carrier 650 and camera module 200 may be connected via a screw connection.

Figure 2F:
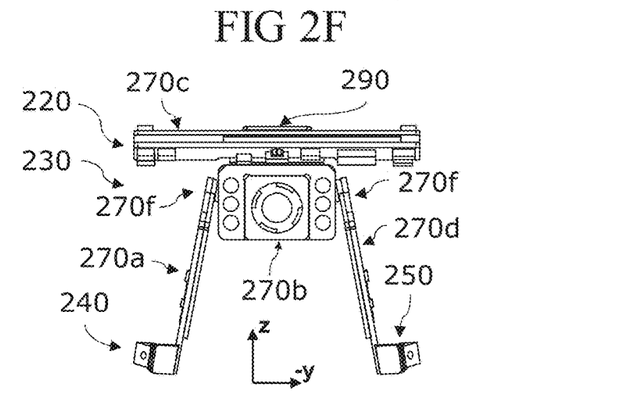
FIG. 2F illustrates a back view of an embedded camera connecting structure of the camera module shown in FIG. 2A according to an embodiment.

FIG. 2F illustrates a back view of a camera connecting structure 370a-f which will be embedded in one-piece base structure 210 of camera module 200 in the course of the manufacturing process according to embodiments.

In the exemplary embodiment, camera connecting structure 370a-f includes in lower portion 230 a circuit board 210a equipped with left eye camera 240, a circuit board 210d equipped with right eye camera 250, and a central circuit board 270b with a central through hole for the scene camera arranged centrally between the six electrical contacts.

Each circuit board 210a, 270d is, in a respective region 270f, flexibly connected with circuit board 270b.

Further, circuit board 270b is connected with a further circuit board 270c arranged in upper portion 220 and equipped with one or more components such as an IC implementing a controller 290 of camera module 200.

Controller 290 may be functionally connected with cameras 240, 250, 260, in particular in electric connection with cameras 240, 250, 260.

Controller 290 may be configured to control cameras 240, 250, 260.

Further, controller 290 may be configured to process images received from cameras 240, 250, 260.

For example, controller 290 may be configured to calculate one or more gaze-related parameters of a user based on the received images.

Figure 3A:
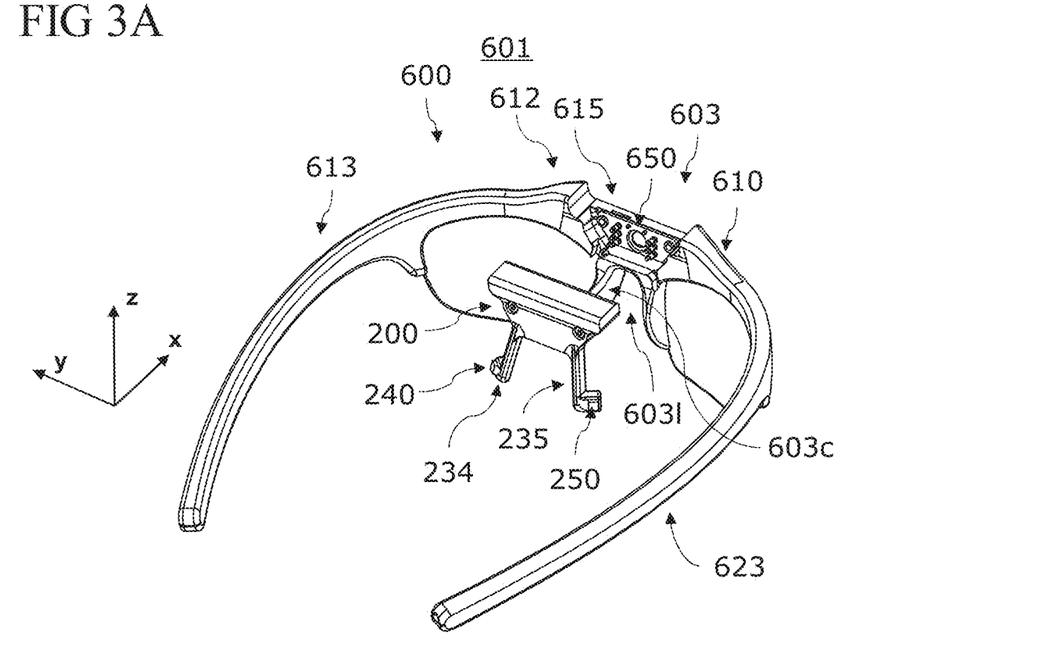
FIG. 3A illustrates a perspective view of a head-wearable device and the camera module shown in FIG. 2A that may be attached to the head-wearable device to form a head-wearable eye tracking device according to an embodiment.

FIG. 3A illustrates a perspective view of a head-wearable device 600 implemented as spectacle device, and the camera module 200 as shown in FIG. 3A that may be attached to head-wearable device 600 to form a head-wearable eye tracking device 601.

In the exemplary embodiment, head-wearable device 600 is implemented as spectacles device. Accordingly, a frame 610 of spectacles device 600 forms a support structure of spectacles device 600. Frame 610 has a front portion 612 only partly surrounding a left ocular opening and a right ocular opening. A central portion 603 of front portion 612 forms a bridge portion arranged between the ocular openings and spectacles lenses, respectively. Further, a left temple 613 and a right temple 623 are attached to front portion 612.

Furthermore, a passage opening for the scene camera of eye tracking module 200 and the field of view of the scene camera, respectively, is formed in bridge portion 603.

Likewise, carrier 650 accommodated in bridge portion 603 and arranged on the wearer-side of bridge portion 603 has a through hole for the scene camera and six exemplary spring-loaded pins of two plugs for the two-part electric socket 271, 272 shown in FIG. 2A.

Eye tracking module 200 is shaped at least substantially complementary to central portion 603 of frame 610 of head-wearable device 600, more particular to fit into a recess or opening 615 of central portion 603 with attached carrier 650 of head-wearable device 600.

In a lower part 603*l*, central portion 603 of frame 610 is formed as a nose-bridge portion. Accordingly, lower part 603*l* has appropriately shaped contact surface 603*c* for the user's nose and the bridge of the user's nose, respectively. Contact surface 603*c* may also be considered as support surface of central portion 603 and frame 610, respectively.

A first nose pad and a second pad may be attached to lower part 603*l*, but typically not to leg portions 234, 235. The first nose pad and/or the second nose pad may be adjustable and/or exchangeable attached to the lower part 603*l*.

A second electric connector in electric contact with the first two-part electric connector of carrier 650 may be accommodated at the dorsal and of left or right temple 613, 623.

The second electric connector may be used for connecting with a companion device such as a smart phone or tablet. For example, the second electric connector may be a USB-connector.

Figure 3B:
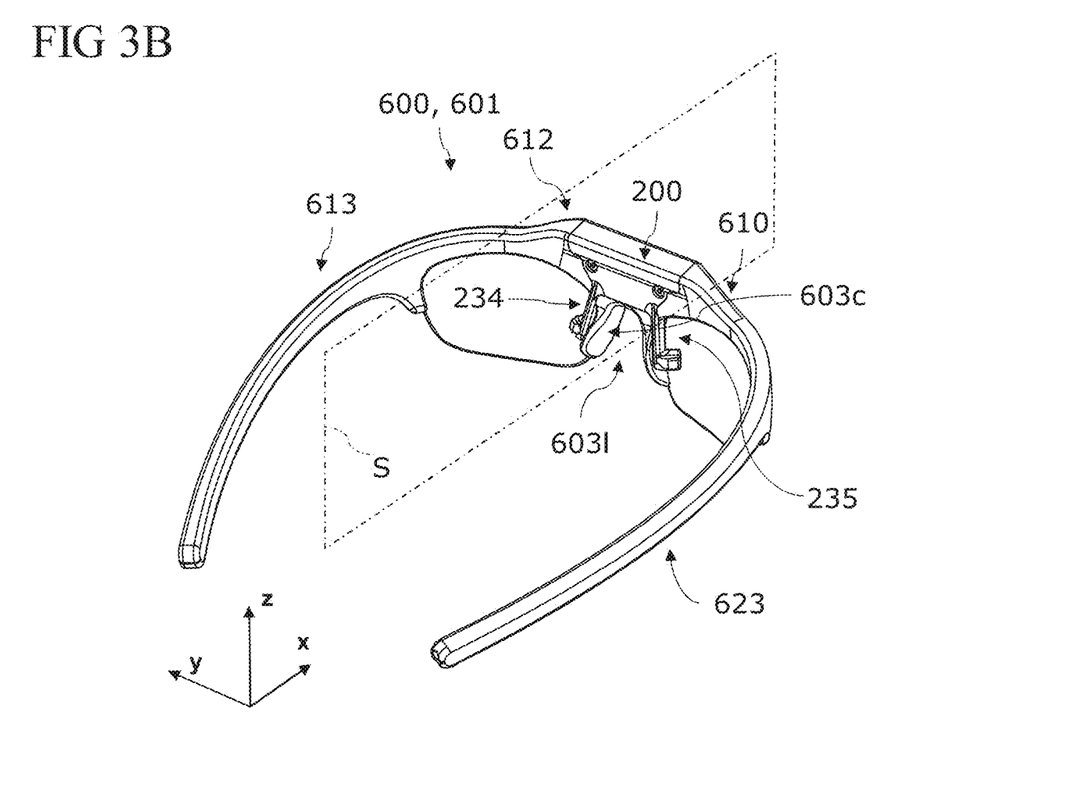
FIG. 3B illustrates a perspective view of the head-wearable device shown in FIG. 3A complemented with the camera module shown in FIG. 3A according to an embodiment to form a head-wearable eye tracking device.

FIG. 3B illustrates a perspective view of head-wearable eye tracking device 601 including camera module 200 in assembled state. In the exemplary embodiment, both the first leg portion 234 and the second leg portion 235 are spaced apart from central portion 603 of frame 610. Accordingly, the camera poses remain at least substantially fixed under normal wearing/use conditions. And are at least largely independent of any deformation of frame 610 under these conditions, respectively.

As illustrated in FIG. 3B, symmetry plane S of module 200 may, in the mounted state, also represent a symmetry plane for frame 610.

Figure 4A:
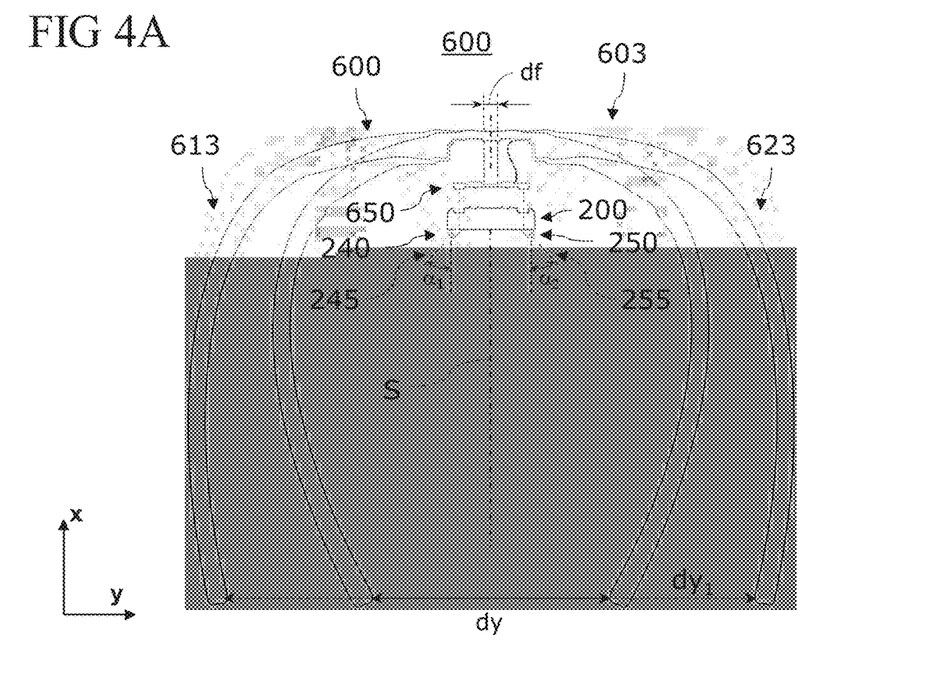
FIG. 4A illustrates, in an exploded top view, bending states of the head-wearable eye tracking device shown in FIG. 3B according to an embodiment.
Figure 4B:
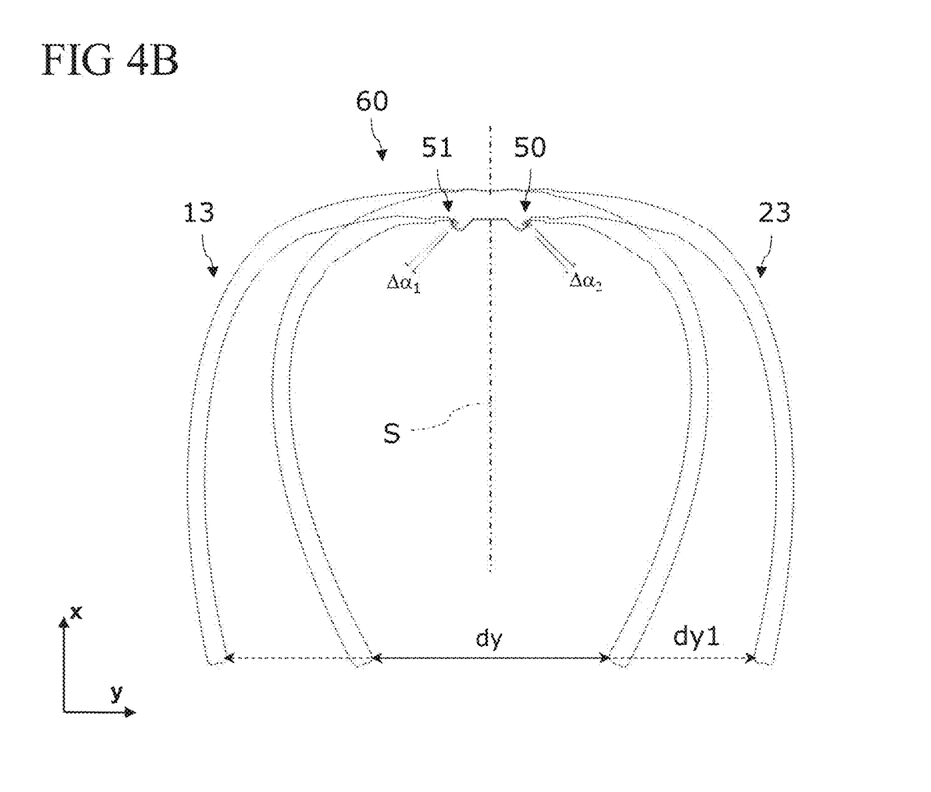
FIG. 4B illustrates, in a top view, bending states of a head-wearable eye tracking device with integrated eye cameras.

FIG. 4A illustrates, in an exploded top view, two bending states of head-wearable eye tracking device 601 shown in FIG. 4B.

Due to the central fixation of camera module to the frame 610, optionally via carrier 650, the angle $\alpha_1$ between and an optical axis 245 of left eye camera 240 and symmetry plane S, and a second angle $\alpha_2$ between an optical axis 255 of right eye camera 250 and symmetry plane S, and, thus, the relative angle $\alpha_1+\alpha_2$ between optical axes 245, 255 is substantially independent of flex of the head-wearable indicated by distance dy, $dy_1$ between the ends of the temples 613, 623, at least for typical distances dy, $dy_1$.

Different thereto, the corresponding angles typically vary substantially depending on the bending state of a head-wearable eye tracking devices 60 with integrated eye cameras as illustrated in FIG. 4B by the angle ranges $\Delta\alpha_1$, $\Delta\alpha_2$. This may have a substantial impact on accuracy of eye parameter determination.

In the illustrated embodiment, carrier 650 is fastened to central portion 603 with two screws in a mirror-symmetric way with respect to plane S and at a respective distance df/2 of 3.75 mm from plane S.

Figure 5A:
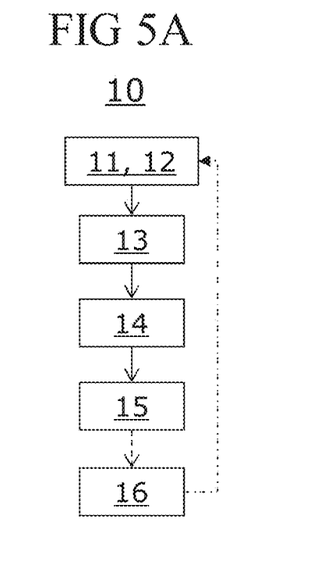
FIG. 5A is a flow chart of a method for manufacturing a camera module for a head-wearable device according to embodiments.
Figure 5B:
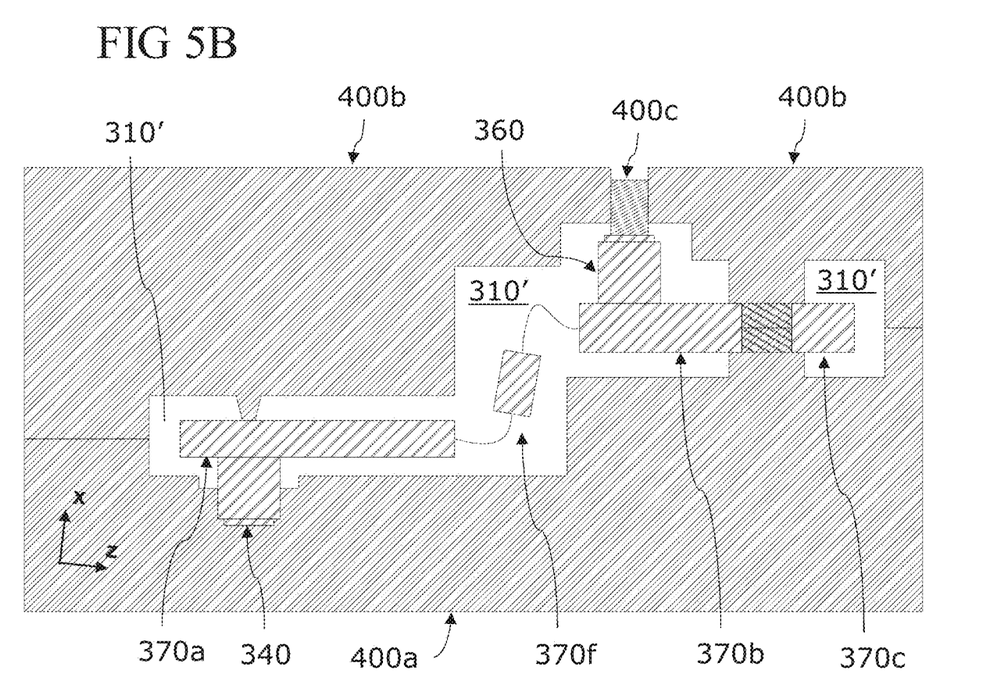
FIG. 5B and FIG. 6 illustrate a method for manufacturing a camera module and the manufactured camera module in respective side views according to embodiments.
Figure 6:
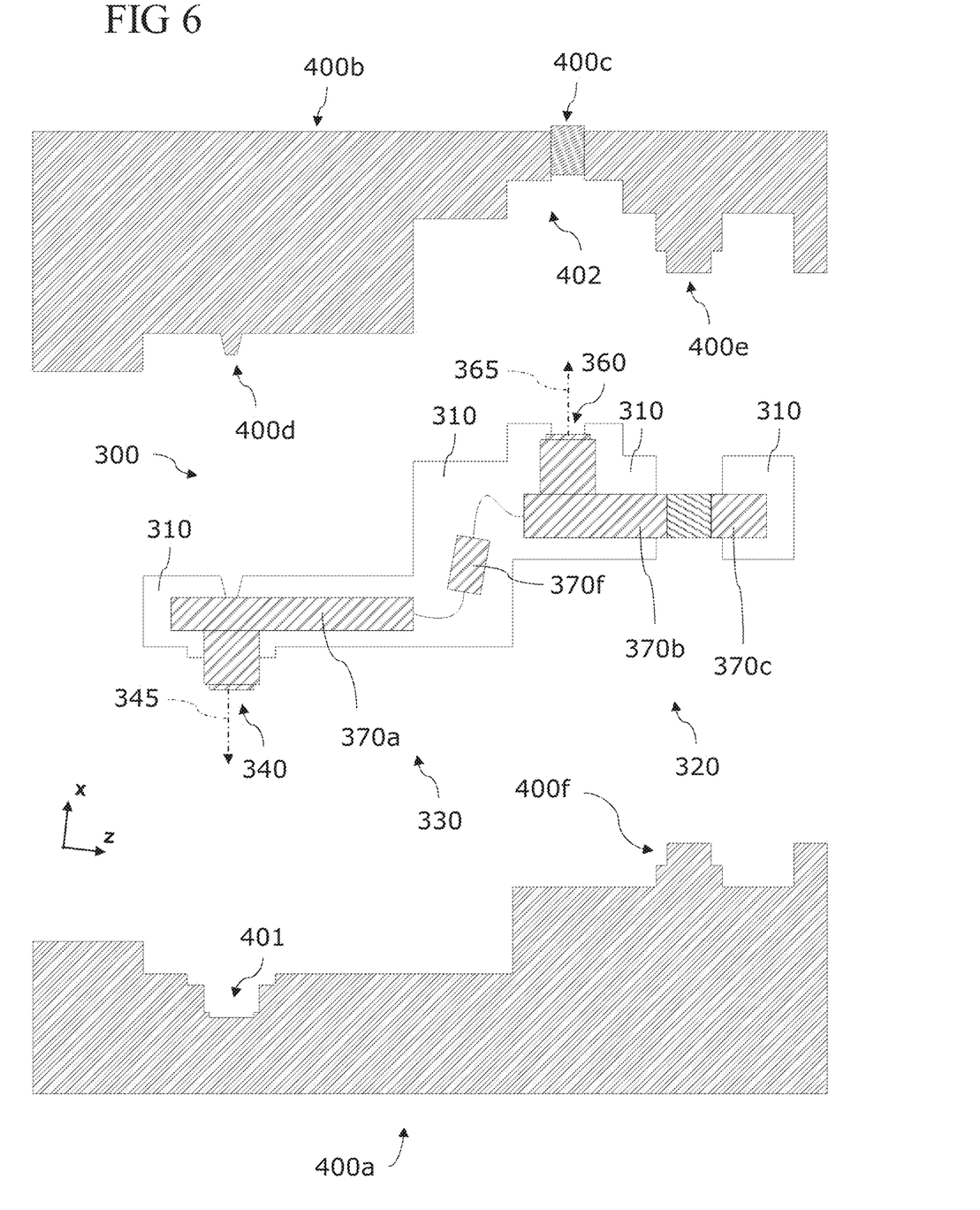

With regard to FIGS. 5A to 6 methods for manufacturing a camera module and the manufactured camera module, respectively, are explained.

As shown in the flow chart of FIG. 5A, a method 10 for manufacturing a camera module for complementing a support structure of a head-wearable device, in particular a camera module as explained herein, method 10 may include providing a camera connecting structure assembled with a first eye camera, and a second eye camera, in a block 11, and providing a mold with a first fixation structure for the first eye camera and a second fixation structure for the second eye camera, in a block 12.

Thereafter, the connecting structure may be arranged in the mold so that the first eye camera is stably held by the first fixation structure, and the second eye camera is stably held by the second fixation structure, in a block 13.

Thereafter, the mold is, in a block 14, filled with a liquid material that can be solidified to from a long-term stable, substantially transparent and mechanically sufficiently stable material, in particular a respective silicone or plastic.

Thereafter, the material is solidified in a block 15.

Solidifying typically includes curing of the material, in particular chemical or thermal curing, and/or may be a two-stage process with a prolonged post-cure process.

Accordingly, a positional and orientational relationship of the first eye camera and the second eye camera with respect to each other may be at least substantially fixed and reproducibly obtained.

Thereafter, the manufactured camera module may be removed from the mold in a block 16, and method 10 may return to block 12 as indicated by the dashed-dotted arrow in FIG. 5A.

Thereafter, the manufactured camera module may be connected with a central portion of a support structure of a head-wearable eye device, typically via a plug-socket connection and/or a carrier arranged in between.

Typically, the camera connecting structure is additionally provided with a scene camera which is also stably held in the mold during filling and solidifying.

FIG. 5B shows a side view of an exemplary two-part mold 400*a*, 400*b* and a camera connecting structure 370*a*, 370*b*, 370*c*, 370*f* which is additionally provided with a scene camera 360, and which is arranged in mold 400*a*, 400*b* with its parts 400*a*, 400*b* arranged one above the other.

In the schematic side view of FIG. 5B, the typically provided second eye camera is hidden by the first eye camera 340. This also applies to FIG. 6 showing a corresponding side view after filling the voids 310' in mold 400*a*, 400*b* with a material, solidifying the material, and opening mold 400*a*, 400*b* to remove the manufactured camera module 300 with the camera connecting structure 370*a-f* being embedded in a one-piece base structure 310 formed in the mold.

In the exemplary embodiment, camera connecting structure 370*a*, 370*b*, 370*c*, 370*f* is flexible in a connecting part or region 310f between a part 370a equipped with first eye camera 340 and a part 370b equipped with scene camera 360, but may be sufficiently stiff in the other parts, in particular part 310.

Accordingly, camera connecting structure 370a, 370b, 370c, 370f may be placed in lower part 400a which is followed by covering lower part 400a with upper part 400b, and optionally covering the optical entrance of scene camera 360 with a plug 400c if the objective of scene camera 360 is desired to be laterally covered by the material but not on top, so that the camera poses are held during filling and curing.

This way, manufacturing tolerances and imperfections of the typically mass-produced camera connecting structures 370a-f do not negatively impact the reproducibility of the camera poses of the final camera module, since all modules are produced using the same highly accurate mold that tightly grips the cameras and thus precisely defines and reproduces their mutual poses.

In the exemplary embodiment, eye camera 340 is held by a void 401 in lower part 400a fitting with eye camera 340 next to the optical entrance of eye camera 340 and a protrusion 400d of the upper part 400b.

In the closed state of mold 400a, 400b shown in FIG. 5B, void 401 and protrusion 400d form a fixation structure for eye camera 340.

Void 401 and protrusion 400d may be centred with respect to each other and an optical axis 345 of eye camera 340, respectively.

Further, in the exemplary closed state of mold 400a, 400b, scene camera 360 is not held by void 402 of upper part 400b and a corresponding support structure of lower part 400a, which is also possible and generally preferred, but by a fixation structure 400e, 400f for the rigid parts 370a, 370c, e.g. a common PCB board 370b, 370c for the scene camera 360 and a controller of camera module 300.

In the exemplary embodiment, fixation structure 400e, 400f is formed by plugs that fit into a hole of common PCB board 370b, 370c from top and bottom, respectively.

While the manufacturing method is typically used for manufacturing camera modules with three cameras, it may also be used for manufacturing a camera module with only two cameras, i.e. with two eye cameras, or with one eye camera and one scene camera.

According to an embodiment a method for manufacturing a watertight camera module for complementing a head-wearable device, the method includes: providing a camera connecting structure equipped with at least two of, typically all of: a first eye camera for taking first images of at least a portion of a first eye of a user wearing the head-wearable eye tracking device formed by complementing the head-wearable device with the camera module, a second eye camera for taking second images of at least a portion of a second eye of the user wearing the head-wearable eye tracking device, and a scene camera for taking scene images of a visual field of the user wearing the head-wearable eye tracking device, and optionally a first light source for illuminating the first eye and/or a second light source for illuminating the second eye, in particular a respective LED. The method further includes providing a mold, arranging the connecting structure in the mold so that the camera is kept stable in terms of location and orientation in the mold, filling the mold with a material; and solidifying the material.

In a closed state, the mold may provide a respective fixation structure for the camera and/or a rigid part of the camera connecting structure next to the respective camera.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A camera module for complementing a support structure of a head-wearable device to form a head-wearable eye tracking device the camera module comprising:
   a one-piece base structure comprising an at least semi-transparent material, and comprising an upper portion, a first leg portion and a second leg portion;
   a camera connecting structure embedded in the one-piece base structure;
   a first eye camera connected with the camera connecting structure, and arranged in and/or on the first leg portion;
   a second eye camera connected with the camera connecting structure, and arranged in and/or on the second leg portion; and
   a scene camera connected with the camera connecting structure, and arranged in and/or on the upper portion.

2. The camera module of claim 1, wherein the camera module is formed such that the first leg portion and the second leg portion are spaced apart from the user and/or the support structure when the user is wearing the head-wearable eye tracking device, wherein the camera module is formed by overmolding, wherein the material is a cured material, wherein the camera connecting structure is embedded in the one-piece base structure, wherein the one-piece base structure is substantially transparent in at least one of: an IR-light range, a near-IR light range, and a visible light range, and/or wherein the one-piece base structure comprises at least one of a silicone and a plastic.

3. The camera module of claim 1, wherein at least one of the first eye camera, the second eye camera, and the scene camera is at least partly embedded in the one-piece base structure, wherein at least one of the first eye camera, the second eye camera, and the scene camera is arranged waterproof in the one-piece base structure, and/or wherein the camera module is waterproof.

4. The camera module of claim 1, wherein at least one of the first eye camera, the second eye camera, and the scene camera is mechanically and electrically connected to the camera connecting structure, wherein the camera connecting structure is at least partially flexible, wherein the camera connecting structure comprises a respective circuit board for each of the first eye camera, the second eye camera, and the scene camera, a further circuit board configured for receiving respective images from each of the first eye camera, the second eye camera, and the scene camera, and a wire connection between the circuit boards, and/or wherein the camera connecting structure comprises an at least partially flexible circuit board.

5. The camera module of claim 1, wherein an outer surface of the one-piece base structure is at least substantially mirror symmetric with respect to a symmetry plane, wherein the scene camera is at least substantially centered with respect to the symmetry plane, and/or comprises an optical axis at least substantially arranged in the symmetry plane, wherein the first eye camera and the second eye camera are at least substantially mirror-symmetric with respect to the symmetry plane, and/or wherein the camera module comprises a fastenings means arranged at least close to the symmetry plane for fastening with a central portion.

6. The camera module of claim 5, wherein a distance between the two fastening means is at most 15 mm, and/or wherein the fastening means are implemented as a respective mechanical fastening means.

7. The camera module of claim 1, wherein the camera module is implemented as an eye tracking module.

8. The camera module of claim 1, wherein the camera module comprises a controller in electric connection with all of the camera connecting structure, the scene camera, the first eye camera and the second eye camera.

9. The camera module of claim 8, wherein the controller is arranged in the upper portion and/or on a further circuit board configured for receiving respective images from each of the first eye camera, the second eye camera, and the scene camera.

10. The camera module of claim 1, wherein the camera module is configured for complementing a respective frame of the head-wearable device.

11. The camera module of claim 1, wherein the one-piece base structure comprises a substantially transparent material.

12. A head-wearable eye tracking device, comprising:
a support structure comprising a central; and
a camera module connected with the central portion and comprising:
   a one-piece base structure comprising an at least semi-transparent material, and comprising an upper portion, a first leg portion and a second leg portion;
   a camera connecting structure embedded in the one-piece base structure;
   a first eye camera connected with the camera connecting structure, and arranged in and/or on the first leg portion;
   a second eye camera connected with the camera connecting structure, and arranged in and/or on the second leg portion; and
   a scene camera connected with the camera connecting structure, and arranged in and/or on the upper portion.

13. The head-wearable eye tracking device of claim 12, wherein the first leg portion and the second leg portion are at least substantially mechanically decoupled from the support structure, spaced apart from the support structure and/or from the user when the head-wearable eye tracking device is worn by the user, wherein the camera module is attached to the central portion so that a camera pose of the first eye camera and a camera pose of the second eye camera with respect to each other remain at least substantially fixed even when the central portion of the support structure is deformed under normal wearing conditions, in particular by using a fastener fitting with the respective fastening means of the camera module, and/or wherein the head-wearable eye tracking device comprises:
a carrier mechanically connected with and arranged between the upper portion of the one-piece base structure and the central portion of the support structure, and configured to reduce a transmission of a deformation of the central portion of the support structure to the upper portion of the camera module.

14. The head-wearable eye tracking device of claim 12, wherein the central portion is, in a lower part, shaped as a nose bridge portion and/or provides a support surface for the user's nose, wherein the carrier is releasably connected with the upper portion of the one-piece base structure and the central portion of the support structure, wherein the carrier comprises an at least substantially central trough hole or transparent region for the scene camera, is fastened to the central portion, and/or is implemented as a circuit board, and/or wherein the head-wearable eye tracking device comprises a plug-socket connection between the camera module and the carrier or between the camera module and the central portion.

15. A method for manufacturing a camera module for a head-wearable device, the method comprising:
providing a mold comprising a first fixation structure for a first eye camera and a second fixation structure for a second eye camera;
providing an at least partly flexible camera connecting structure equipped with a first eye camera and the second eye camera;
arranging the camera connecting structure in the mold so that the first eye camera is arranged at the first fixation structure, and the second eye camera is arranged at the second fixation structure;
filling the mold with a material; and
solidifying the material to at least substantially fix a positional and orientational relationship of the first eye camera and the second eye camera with respect to each other.

16. The method of claim 15, wherein solidifying comprises curing of the material.

17. The method of claim 15, wherein solidifying comprises at least one of chemical curing of the material and thermal curing of the material.

18. The method of claim 15, wherein the camera connecting structure comprises a partially flexible board, wherein the camera connecting structure is additionally provided with at least one of a scene camera, a first light source for illuminating a field of view of the first eye camera, and a second light source for illuminating a field of view of the second eye camera, wherein the mold comprises a third fixation structure for the scene camera and/or a recess for partly accommodating the scene camera, wherein arranging the connecting structure in the mold comprises at least one of: arranging the scene camera in the recess and on a sealing support of the mold, and ranging the scene camera at a respective sealing support for an optical entrance of the scene camera, and/or using the third fixation structure of the mold to fix the camera connecting structure next to the scene camera.

19. The method of claim 15, wherein the first fixation structure is implemented as a first receptacle for a portion of the first eye camera and the second fixation structure is implemented as a second receptacle for a portion of the second eye camera, the first receptacle at least substantially positively fitting with a housing of the first eye camera next to an optical entrance of the first eye camera, wherein the second fixation structure is implemented as a second receptacle at least substantially positively fitting with a housing of the second eye camera next to an optical entrance of the second eye camera, wherein at least one of the first fixation structure and the second fixation structure are implemented as a respective recess or hole in a wall of the mold, and/or wherein the connecting structure is arranged in the mold so that a portion of the first eye camera is arranged in the first receptacle and a portion of the second eye camera is arranged in the second receptacle.

20. The method of claim 15, wherein the material is transparent, and/or is selected from a list comprising a plastic, and a silicone.

* * * * *